United States Patent
Morita

Patent Number: 5,113,614
Date of Patent: May 19, 1992

[54] FISHING LINE DEVICE

[76] Inventor: Toshio Morita, 177 Donlands Avenue, Toronto, Ontario, M4J 3P3, Canada

[21] Appl. No.: 374,708

[22] Filed: Jul. 3, 1989

Related U.S. Application Data

[63] Continuation-in-part of Ser. No. 136,605, Dec. 22, 1987, Pat. No. 4,870,777.

[51] Int. Cl.⁵ ............................................. A01K 91/06
[52] U.S. Cl. .................................. 43/42.74; 43/44.94; 43/44.95
[58] Field of Search .............. 43/42.72, 42.74, 44.95, 43/44.92, 43.1

[56] References Cited

U.S. PATENT DOCUMENTS

| | | | |
|---|---|---|---|
| 983,310 | 2/1911 | Pflueger | 43/42.74 |
| 1,152,755 | 9/1915 | Perron | 43/44.94 |
| 1,512,656 | 10/1924 | Ward | |
| 1,603,293 | 10/1926 | Pflueger | 43/44.94 |
| 2,163,483 | 6/1939 | Carlisle | 43/44.95 |
| 2,759,290 | 8/1956 | Strausser | 43/42.72 |
| 3,514,891 | 6/1970 | Krull | |
| 4,361,977 | 12/1982 | Lawler | |

FOREIGN PATENT DOCUMENTS

| | | | |
|---|---|---|---|
| 629489 | 10/1961 | Canada | 43/42.74 |
| 849701 | 9/1960 | United Kingdom | 43/44.95 |

*Primary Examiner*—Kurt Rowan
*Attorney, Agent, or Firm*—Barrigar & Oyen

[57] ABSTRACT

A lure device comprises a float from which is pivotably suspended a hanger having two arms which guide and secure the fishing line. The securing of the fishing line is achieved by a helical member and a complementary pin. The helical member may have a central guide to assist in winding the line through the helical member.

6 Claims, 4 Drawing Sheets

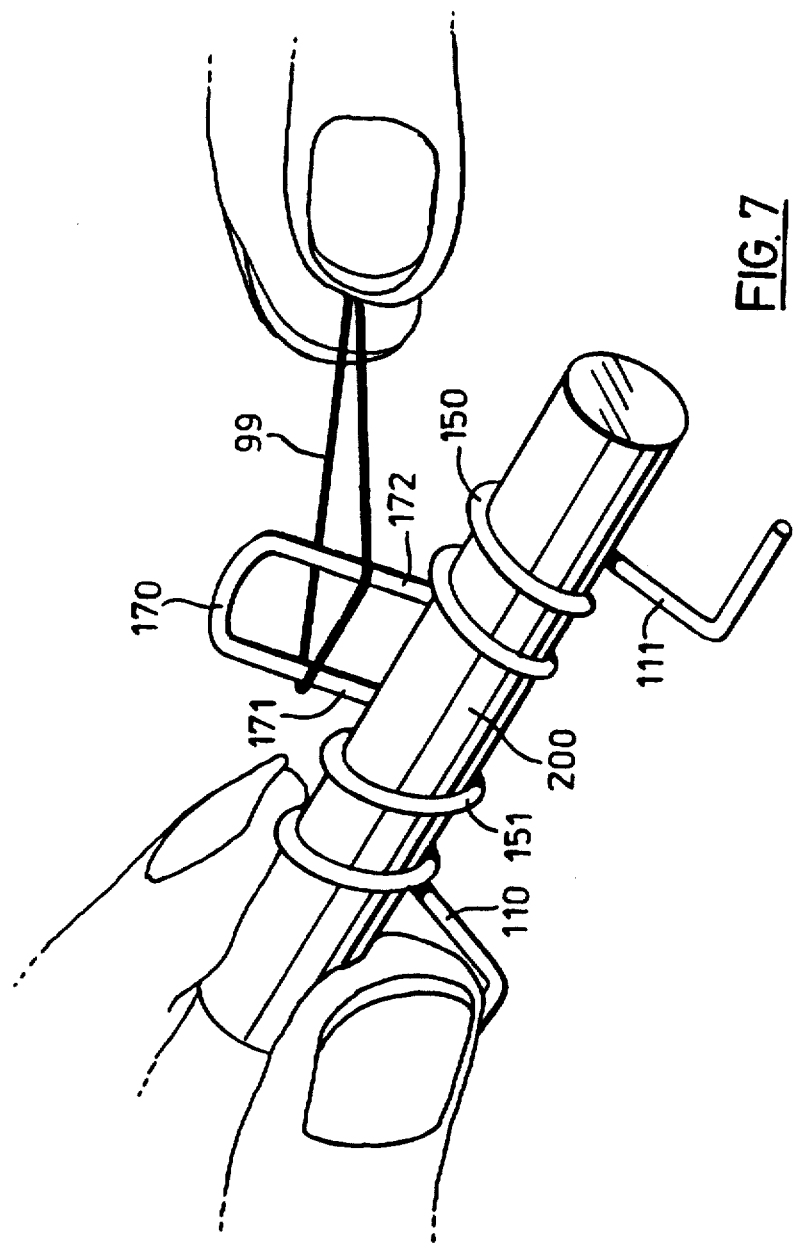

FISHING LINE DEVICE

This application is a continuation-in-part of Ser. No. 136,605 filed Dec. 22, 1987, U.S. Pat. No. 4,870,777.

BACKGROUND OF THE INVENTION

1. Field of Invention

This invention relates to fishing line and lure devices.

2. Prior Art.

Floats are known in the art, for example, U.S. Pat. No. 1,512,656 (Ward). Line securing devices are known in the art, for example, U.S. Pat. No. 4,361,977. Such floats and line securing devices do not offer the advantages of the present invention.

SUMMARY OF INVENTION

According to the present invention, there is provided a hanger for use with a lure and a continuous fishing line, comprising: float means; an elongate member having two arms and being pivotably connected, at an intermediate portion thereof, to said float means; wherein said first arm has means adapted for securing a first portion of the fishing line, and said second arm has means adapted for securing a second portion of the continuous fishing line.

Also according to the present invention, there is provided a hanger for use with a lure and a continuous fishing line, comprising: float means; an elongate member having two arms and being pivotably connected, at an intermediate portion thereof, to said float means; wherein said first arm has means adapted for securing a first portion of the fishing line, and said second arm has means adapted for guiding a second portion of the continuous fishing line.

Also according to the present invention, there is also provided a hanger for a lure and a continuous fishing line, comprising: an elongate member with a first arm and a second arm, wherein said first arm has securing means adapted for securing a first portion of the fishing line to said first arm so as to lock said first portion against movement, and said second arm has guide means adapted for guiding a second continuous portion of said fishing line leading to said lure; and first fish enticing means connected to said first arm.

According to the present invention, there is also provided a securing device for a fishing line, comprising: (a) a pin; and (b) a central U-shaped member having first and second arms, said first arm continuing tangentially into a first helical member which turns in a first direction, and said second arm continuing into a second helical member which turns in a second direction opposite direction, said first and said second helical members being coaxial and profiled to accept snuggly said pin.

BRIEF DESCRIPTION OF THE DRAWINGS

As an illustrative example, a preferred embodiment of the invention is described in conjunction with the following drawings, in which:

FIG. 7 is an expanded front perspective view of an alternative preferred embodiment of the pin and helix of FIG. 2.

DETAILED DESCRIPTION OF THE PREFERRED EMBODIMENTS

Figure 1:
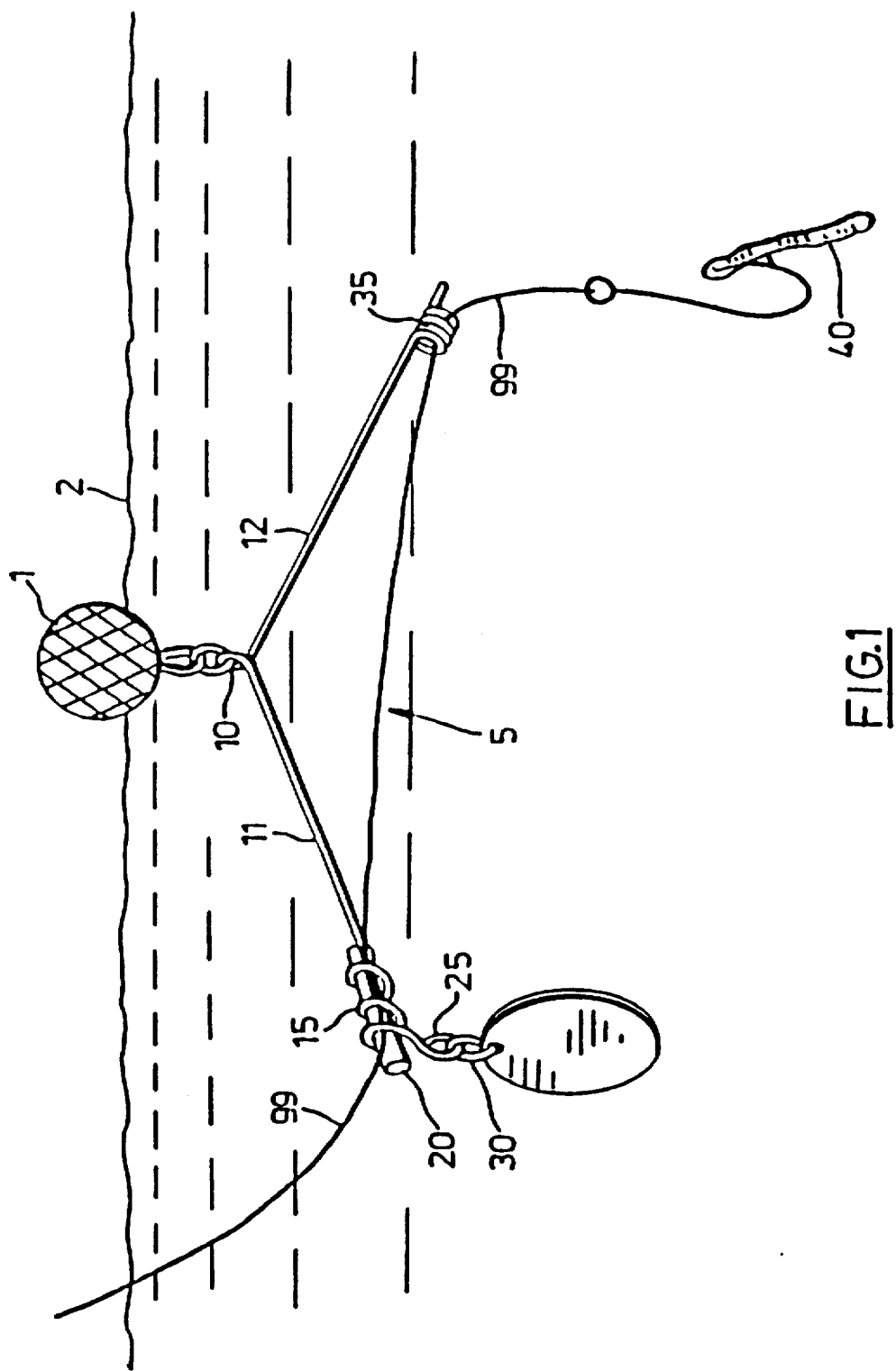
FIG. 1 is a front perspective view of the device of the invention.

Referring to FIG. 1, there is a float 1 floating on water surface 2. A rigid hanger, generally designated as 5, has a central eyelet 10 and two elongate arms 11 and 12, extending therefrom to form a obtuse angle therebetween. Float 1 is connected to eyelet 10 in any manner which permits free pivot of eyelet 10 and the remainder of hanger 5 with respect to float 1. A ring arrangement is illustrated in FIG. 1 but it will be appreciated that a swivel arrangement or other conventional arrangements are possible.

Figure 2:
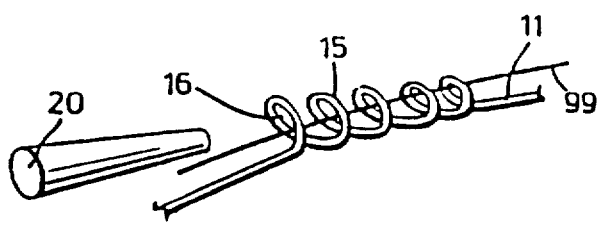
FIG. 2 is an expanded front perspective view of the wedge pin and spiral helix illustrated in FIG. 1.

As best seen in FIGS. 1 and 2, there is on arm 11 a spiral helix 15 with a complementary wedge pin 20. Spiral helix 15 has an axial aperture 16 therethrough and is defined by a continuum of individual coaxial helixes disposed in spaced longitudinal relationship. Spiral helix 15 continues into distal eyelet 25, to which a conventional metal spinner combination 30 is conventionally and pivotably fastened.

Fishing line 99 is manually guided into axial aperture 16 and through spiral helix 15. Fishing line 99 is secured against longitudinal movement with respect thereto by the insertion and wedging of wedge pin 20, which friction grips a portion of fishing line 99 between wedge pin 20 and spiral helix 15. Fishing line 99 continues past spiral helix 15, as described next.

Figure 3A:
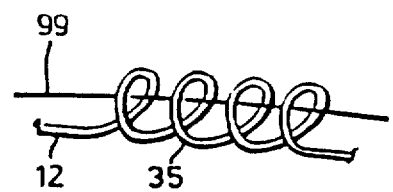
FIG. 3A is an expanded front perspective view of the distal helix illustrated in FIG. 1.

As best seen in FIGS. 1 and 3A, arm 12 has a distal helix 35, through which is guided fishing line 99 continued from spiral helix 15 of arm 11. Fishing line continues to a sinker, hook, bait and other means for enticing fish, designated generally as 40.

In operation, hanger 5 performs like an underwater mobile, suspended from float 1 on water surface 2. Water currents act to spin and displace spinner 30 on arm 11, which spin and displacement is reciprocated by like action of bait 40 on arm 12, a pivot action being created about centrally eyelet 10. The use of live bait 40, such as a worm, will cause reciprocal action of spinner 30. Waves on water surface 2 will cause float 1 to bob and move therealong, thereby causing displacement and spinning of spinner 30 and bait 40. By the manual tugging of fishing line 99, similar action can be achieved. The result of any of the above actions is the presentation of two moving spaced apart targets, spinner 30 and bait 40, to better entice fish.

It has been found that float 1 may be suitably constructed with a styrofoam ball of two centimeters diameter, and enmeshed in fine fishnet; that arms 11 and 12 may be approximately three centimeters long and made of piano wire; and that pin 20 may be approximately one to three centimeters long and made of bamboo. However, the physical characteristics of wedge pin 20, float 1 and hanger 5,—their buoyancy, weight, and size—may be varied so long as, in operation, hanger 5 is pivotally suspended underwater by float 1, much like an ordinary hanger would hang from a rack.

Figure 3B:
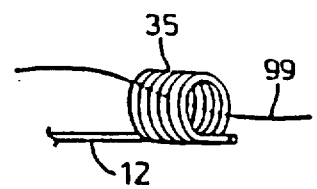
FIG. 3B is an expanded front perspective view of a second embodiment of the distal helix.

In a second embodiment of distal helix 35, best seen in FIG. 3B, the separation between adjacent helixes is narrowed so that fishing line 99 may be manually wedged therebetween. In this embodiment, a sinker further down fishing line 99 may not be necessary, as the tension of that portion of fishing line 99 between distal helix 35 and spiral helix 15 is maintained by the wedging at said helixes. Not shown is a variation of distal helix 35 where the adjacent helix progressively narrows in the distal direction, culminating in one pair of adjacent helixes having a sufficiently narrow separation to wedge a portion of fishing line 99. This would permit easy manual guidance of the fishing line 99 into a wedged position.

Figure 4:
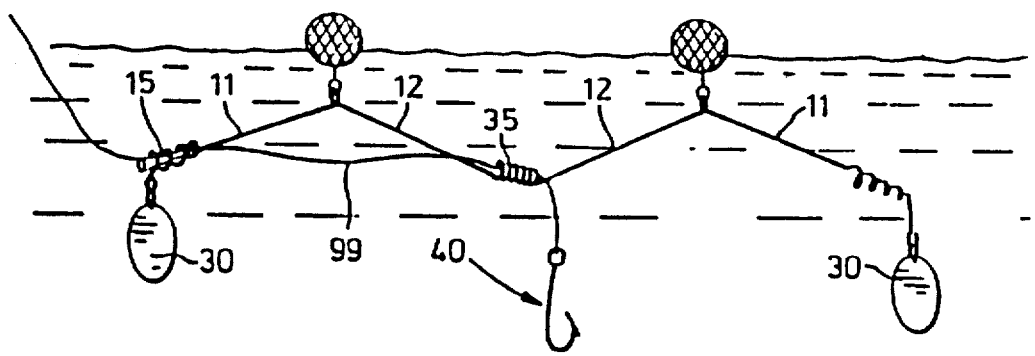
FIG. 4 is a front perspective view of an alternative preferred embodiment of the invention.
Figure 5:
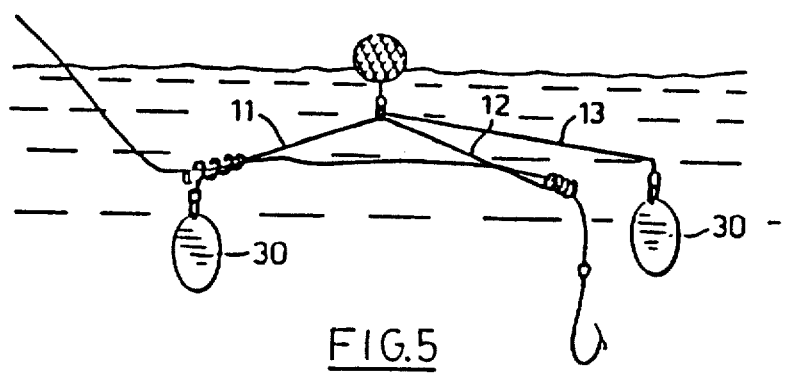
FIG. 5 is a front perspective view of an alternative preferred embodiment of the device of the invention having three arms.

An alternative embodiment as illustrated in FIG. 4, is an assembly of two hangers according to the present invention, rotably connected by interconnection of their respective distal helixes 35. In this configuration two reciprocating spinners 30 are provided for enticing fish. In another alternative, as illustrated in FIG. 5, there is an additional arm 13 rigidly attached to central eyelet 10, with associated spinner 30. In this way, three moving enticing objects are presented.

It will be appreciated that varying the relative lengths of arms 11, 12 and 13 will vary the reciprocating relationship between spinners 30 and bait 40. In other words, eyelet 10 need not be precisely centrally positioned.

It will also be appreciated that arms 11, 12 and 13, identified as an "elongate arm" for simplicity, may in fact be elongated, arcuate, spiral, irregular or take on some other suitable geometry. Accordingly, the reciprocating relationship between spinners 30 and bait 40 may be varied advantageously for specialized circumstances.

Figure 6:
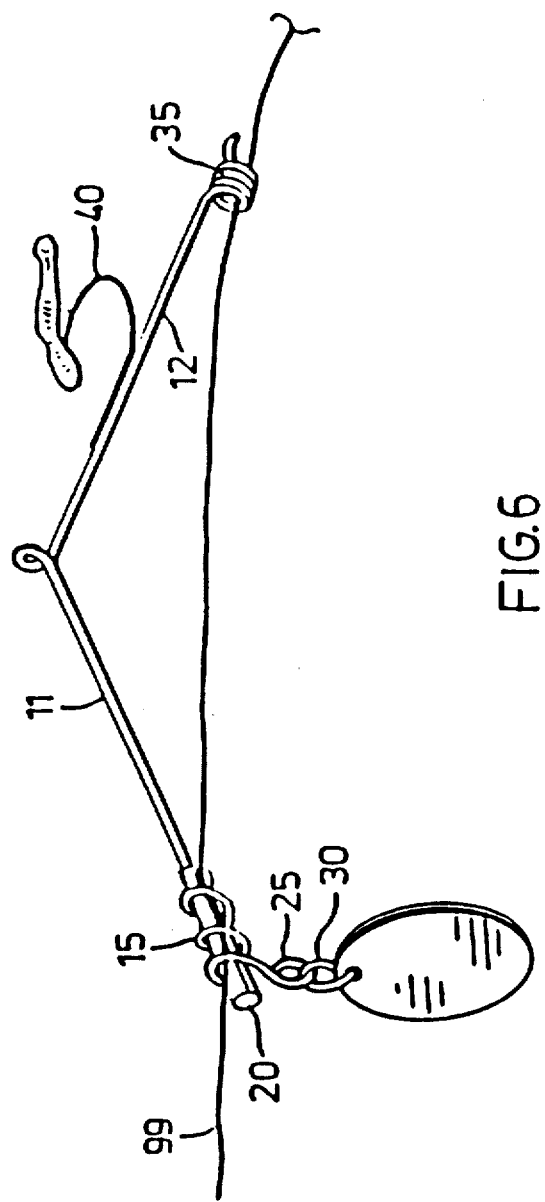
FIG. 6 is a front perspective view of an alternative preferred embodiment of the device.

In FIG. 6, a variation is illustrated similar to the embodiment illustrated in FIG. 1. There is live bait on a hook at 40 which is rigidly attached to arm 12 by conventional means. Line 99 runs through distal helix 35, and may terminate there by attachment thereto, or continue to carry additional hooked bait (not shown). The main difference between this variation and that illustrated in FIG. 1 is the absence of float 1. In this way, underwater fishing is facilitated.

It will be appreciated that a spiral helix 15 may be, for simplicity, replaced with other conventional fastening means line an elastic band or simple manual knotting; and that distal helix 35 need not be fastening means but may simply be means through which fishing line 99 is slidably guided.

A variation of the line securing device represented by helix 15 and wedge pin 20 of FIG. 2 is illustrated in FIG. 7. In this variation, the securing device has two helical end portions joined by a central, offset member which serves to guide the fishing line into the apertures of the helical portions. Specifically, there are two coaxial helical portions 150 and 151, which have opposite turns, and a pin 200 which is profiled to be snugly inserted in and through the apertures of helical portions 150 and 151. The helical portions 150 and 151 are joined by a central member 170, which is tangentially offset from the inner proximate ends of helical portions 150 and 151 by arms 172 and 171 respectively. Members 170 and arms 171 and 172 form a central U-shaped member. The outer ends of helical portions 150 and 151 continue tangentially as arms 111 and 110 respectively, and then bend, transversely, away from each other.

The line securing procedure is as follows. After pin 200 has been snugly inserted into the apertures of helical portions 150 and 151, the user loops line 99 around central member 170 and arms 171 and 172, and then pulls looped line 99 toward the tangential junction of arms 171 and 172 and their associated ends of helical members 151 and 150. Looped line 99 is then unlooped and wound between pin 200 and helical members 150 and 151 until line 99 extends through the coaxial apertures of helical members 150 and 151, but wedged thereagainst by pint 200.

The security of the grip of the securing device on line 99 can be affected by the snugness of fit of pin 200 in helical portions 150 and 151. It can also be affected by the number of rungs or loops of helical portions 150 and 151. While helical portions 150 and 151 are each shown in FIG. 7 with two rungs or loops, it is possible to have one loop or more than two loops. Increasing the number of loops renders the securing procedure longer but improves the security of the grip between pin 200 and helical portions 150 and 151.

While pin 200 and helical portions 150 and 151 illustrated in FIG. 7 are cylindrical, other configurations are possible, including conical or spiral.

The length of arms 171 and 172 should be sufficient to tangentially position member 170 as an easy target for looped line 99.

Arm 110 may serve as a stop for the user's thumb to prevent the turning of the helical portions 150 and 151 around pin 200 as line 99 is wound therethrough.

This variation of the securing device may be employed in place of helix 15/pin 20 combination as disclosed hereinabove. For example, in FIG. 1, arm 110 may continue into a distal eyelet 25, and arm 111 continues as arm 11.

It will be apparent to those skilled in the art that the preceeding descriptions of various embodiments may be substantially varied to meet specialized requirements without departing from the spirit and scope of the invention disclosed.

What I claim is:

1. A securing device for a fishing line, comprising:
   (a) a pin;
   (b) a central U-shaped member having first and second arms, said first arm continuing tangentially into a first helical member which turns in a first direction, and said second arm continuing into a second helical member which turns in a second direction opposite direction, said first and said second helical members being coaxial and profiled to accept snuggly said pin.

2. A securing device according to claim 1 wherein said first helical member has only one helix.

3. A securing device according to claim 1 wherein said second helical member has only one helix.

4. A hanger for use with a lure and a continuous fishing line, comprising:
   float means; and
   an elongated member having two arms and being pivotally connected, at an intermediate portion thereof, to said float means;
   wherein said first arm has means adapted for securing a first portion of the fishing line, and said second arm has means adapted for securing a second portion of the fishing line;
   wherein said first arm securing means includes:
   (a) a pin;

(b) a central U-shaped member having first and second arms, said first arm continuing tangentially into a first helical member which turns in a first direction, and said arm continuing tangentially into a second helical member which turns in a direction opposite to said first direction, said first and said second helical members being coaxial and profiled to accept snugly said pin by friction grip.

5. A hanger for use with a lure and a continuous fishing line, comprising:

float means; and an elongate member having two arms and being pivotally connected, at an intermediate portion thereof, to said float means;

wherein said first arm has means adapted for securing a first portion of the fishing line, and said second arm has means adapted for guiding a second portion of the fishing line;

wherein said first arm securing means includes;

(a) a pin;

(b) a central U-shaped member having first and second arms, said first arm continuing tangentially into a first helical member which turns in a first direction, and said second arm continuing tangentially into a second helical member which turns in a direction opposite to said first direction, said first and said second helical members being coaxial and profiled to accept snugly said pin by friction grip.

6. A hanger for a lure and a continuous fishing line, comprising:

an elongate member with a first arm and a second arm, wherein said first arm has securing means adapted for securing a first portion of the fishing line to said first arm so as to lock said first portion against movement, and said second arm has guide means adapted for guiding a second continuous portion of said fishing line leading to said lure; and first fish enticing means connected to said first arm:

wherein said securing means includes:

(a) a pin;

(b) a central U-shaped member having first and second arms, said first arm continuing tangentially into a first helical member which turns in a first direction, and said second arm continuing into a second helical member which turns in a second direction opposite to said first direction, said first and said second helical members being coaxial and profiled to accept snugly said pin.

* * * * *